United States Patent [19]
Edwards

[11] Patent Number: 5,824,193
[45] Date of Patent: Oct. 20, 1998

[54] METHOD OF THERMALLY TREATING PLASTICS MATERIAL

[76] Inventor: Raymond S. Edwards, 18510 NE. 189th Ct., Brush Prairie, Wash. 98606

[21] Appl. No.: 826,256

[22] Filed: Mar. 27, 1997

[51] Int. Cl.$^6$ .............................. C10B 53/08; C10B 51/00
[52] U.S. Cl. .................................. 201/7; 201/25; 202/96; 202/99
[58] Field of Search .......................... 201/7, 25; 196/116, 196/114, 138; 202/96, 99, 241

[56] References Cited

U.S. PATENT DOCUMENTS

| | | | |
|---|---|---|---|
| 3,829,558 | 8/1974 | Banks et al. ............................. | 423/481 |
| 4,204,906 | 5/1980 | Liu ............................................ | 162/16 |
| 4,208,252 | 6/1980 | Yoshida et al. .......................... | 202/105 |
| 4,642,401 | 2/1987 | Coenen et al. .......................... | 585/241 |
| 4,759,300 | 7/1988 | Hansen et al. .......................... | 110/229 |
| 4,919,686 | 4/1990 | Edwards ................................... | 48/17 R |
| 5,084,140 | 1/1992 | Holland .................................... | 201/19 |
| 5,464,503 | 11/1995 | Avetisian et al. ........................ | 201/3 |
| 5,584,969 | 12/1996 | Nagai et al. ............................. | 196/116 |
| 5,608,136 | 3/1997 | Maezawa et al. ....................... | 588/228 |

*Primary Examiner*—Nina Bhat
*Attorney, Agent, or Firm*—Wood, Herron & Evans, L.L.P.

[57] ABSTRACT

A method of thermally treating plastics material includes the steps of heating a treatment chamber at least to the melting point of at least a fraction of the plastic material, maintaining an oxygen level in the treatment chamber below combustion level of liquid or gaseous products from the plastic material, feeding the plastic material into the treatment chamber at a rate ensuring a built-up of a film of liquified plastic material on at least a part of the interior of the surface of the treatment chamber, with the liquified plastic material undergoing a transition into the gaseous phase as a result of the heating of the treatment chamber, and exiting of the gaseous phase out of the treatment chamber caused by vaporization pressure of the gaseous phase within the treatment chamber.

28 Claims, 1 Drawing Sheet

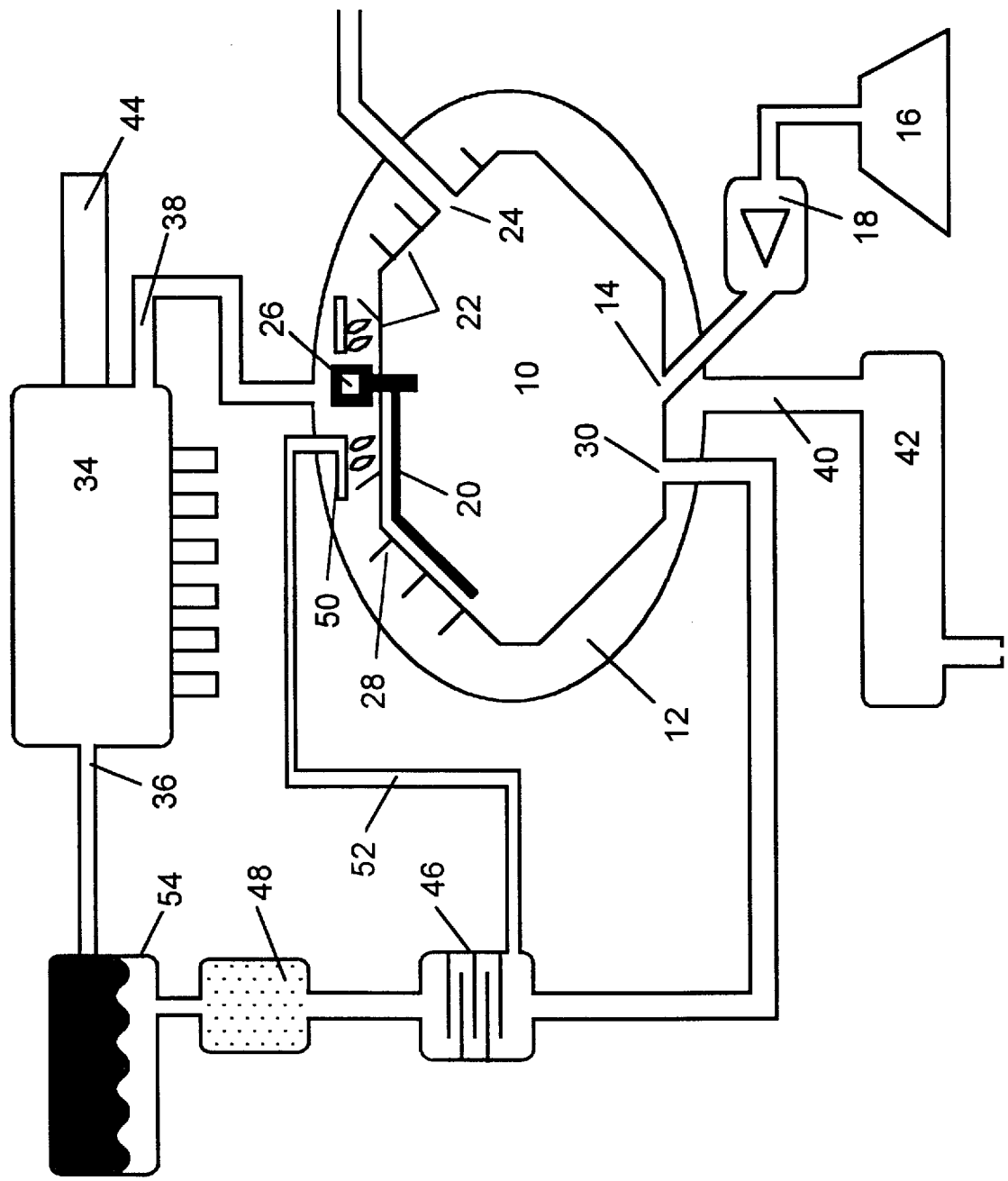

METHOD OF THERMALLY TREATING PLASTICS MATERIAL

BACKGROUND OF THE INVENTION

The present invention is related to a method of thermally treating plastics material. More specifically, the Invention is related to a method of thermally treating plastics material in order to obtain gaseous and/or liquid products from the treatment of virgin and or to a certain extent selected and segregated post consumed waste plastic material.

Such gaseous or liquid products can be used as synthetic fuel for combustion engines, turbines or boilers to replace the limited and finite natural fossil fuel resources or as an additive to lower quality natural fossil fuels to increase the heat value of the obtained mixed fuel product.

PRIOR ART

In the past, others seeked to find efficient methods for thermal treatment of plastics material. However, all these methods known heretofore are utilizing high pressures and/or high temperatures during the treatment of the plastic material. Yet, the efficiency of such known methods is not satisfying and the apparata required to carry out these methods are expensive to produce and to maintain due to the high pressures and/or high temperatures involved.

OBJECTIVE PROBLEM UNDERLYING THE PRESENT INVENTION

The problem underlying the present invention is to provide a method for quickly thermally treating plastics material in order to obtain gaseous and/or liquid products useable as synthetic fuel or as additives to natural fuels, that method being highly efficient, can be carried out in a cost-effective apparatus and obtains gaseous and/or liquid fuel products of high heat value at very competitive cost.

The invention seeks also to provide an apparatus for carrying out the invention in a very efficient and cost-effective way. This apparatus is to be used in stationay or automotive applications, such as generators at production plants, or cars and trucks.

SUMMARY OF THE INVENTION

The inventions teaches a method for thermal treatment of plastics material, including the following steps: heating a treatment chamber at least to the melting point of at least a fraction of said plastic material; maintaining an oxygen level in said treatment chamber below combustion level of liquid or gaseous products from said plastic material; continuously feeding said plastic material into said treatment chamber at a rate ensuring a built-up of a film of liquified plastic material on at least a part of the interior of the surface of said treatment chamber, with said liquified plastic material undergoing a transition into the gaseous phase as a result of the heating of said treatment chamber; and exiting of the gaseous phase out of said treatment chamber caused by vaporization pressure of the gaseous phase within said treatment chamber.

Heating the treatment chamber at least to the melting point of at least a fraction of said plastic material is one of the important aspects of the present invention. At the same time, the temperature of the treatment chamber should not exceed temperatures, significantly above the point where the liquid phase of the molten plastic material undergoes a transition into the gaseous phase. Instead of using temperatures exceeding approximately 1000 degrees Fahrenheit, like some of the prior art methods suggest, the present invention uses an approach of "softly" heat-treating the plastic material, such that it first undergoes a transition into its liquid phase and subsequently undergoes a transition into its gaseous phase. Thus, the gaseous phase contains gas a very large portion of gas constituents having a high heat values.

Maintaining an atmosphere within the treatment chamber below combustion level (i.e. more or less oxygen-free) avoids the combustion of the plastic material or the liquid or gaseous products obtained therefrom. Moreover, the production of furanes or dioxines is avoided.

Feeding said plastic material into said treatment chamber at a continuous rate ensuring a built-up of a film of liquified plastic material on at least a part of the interior of the surface of said treatment chamber, with said liquified plastic material undergoing a transition into the gaseous phase as a result of the heating of said treatment chamber is another important aspect of the invention. In contrast thereto, in known high pressure systems, the higher pressure inevitably requires higher temperatures. This is undesirable due to the higher energy required to produce the gaseous and/or liquid distillate.

Surprisingly it has been found that a very efficient conversion of solid plastic material into its gaseous phase is achieved when the heated surface of the treatment chamber is coated with a thin film of melting or already molten plastic material is maintained. The thickness of the film should not exceed one inch. Very good results are obtained with the thickness of the film not exceeding several millimeters.

Another important aspect of the invention is the exiting of the gaseous phase out of said treatment chamber only caused by vaporization pressure of the gaseous phase within said treatment chamber. This is meant in contrast to prior art methods allowing a high pressure building up within the treatment chamber. This high pressure causes a large portion of the various gas constituents to crack. Contrarily thereto, the method of the invention takes a "soft" approach to have the gaseous phase leave the treatment chamber. This contributes to a large portion of gas constituents having a high heat value.

In order to avoid the introduction of air (containing oxygen) into the treatment chamber when feeding the plastic material into the treatment chamber, the invention teaches to compress the plastic material prior to feeding it into said treatment chamber. This can be done by an extrusion press followed by a pelletizer or any other comparable means. During the initial phase of operation, the treatment chamber and the subsequent piping system (described hereinafter) can be purged with nitrogen or a similar gas to avoid the presence of oxygen.

In order to enhance to fast formation of the film on heated surface of the treatment chamber, a preferred embodiment of the method according to the invention uses the step of size-reduzing said plastic material prior to feeding it to into said treatment chamber, preferably to a size of 1 inch minus (2.54 cm or less). This can be done by the grinding, shreading or pulverizing.

According to another aspect of the invention and depending on the purpose of use of the products obtained from heating the plastic material, the invention teaches to condense the condensable gas constituents of said gaseous phase exiting said treatment chamber to obtain a liquid distillate. If only the liquid products are of interest for further use, said non-condensable gas constituents of said gaseous phase can be used to heat said treatment chamber by feeding it into a burner under the treatment chamber. If the heat produced by said gaseous phase is not sufficient, a portion of said liquid distillate can be used in addition to the gaseous phase to heat said treatment chamber.

In order to allow a relatively undisturbed formation and maintenace of the film on the heated surface of the treatment chamber, it is preferred to remove residual char from said treatment chamber.

In order to remove solid particles from the liquid distillate, it is preferred to filter said liquid distillate.

The same applies to the gaseous phase.

In order to allow storage and transportation of the gaseous phase, it is preferred to compress said gaseous phase into a gas storage container.

According to one aspect of the invention, mixing said gaseous phase with other combustible gases increases the heat value of the resulting gas.

According to the invention, heating said treatment chamber includes heating the surface of said treatment chamber in the range between approximately 180 degrees Fahrenheit and approximately 720 degrees Fahrenheit (approximately 80° C. and 385° C.) and exiting said gaseous phase from said treatment chamber includes maintaining a pressure differential of less than approximately 1 psig (approximately 6890 Pa) between the interior of said treatment chamber and a filtration stage or a condensing stage. Preferably, the pressure differential is less than approximately 0.5 psig (3445 Pa) In this context it is understood, that the filtration stage or the condensing stage is the very first processing stage immediately after the treatment chamber.

According to the invention, the step of feeding plastic material includes feeding plastic material containing High Density Polyethylene (HDPE) and the temperature of the heated surface of said treatment chamber being in the range between approximately 245 degrees Fahrenheit and approximately 650 degrees Fahrenheit (approximately 118° C. and approximately 345° C.).

According to the invention, the step of feeding plastic material also includes feeding plastic material containing Low density Polyethylene (LDPE) and the temperature of the heated surface of said treatment chamber being in the range between approximately 225 degrees Fahrenheit and approximately 650 degrees Fahrenheit (approximately 118° C. and approximately 345° C.).

According to the invention, the step of feeding plastic material also includes feeding plastic material containing Linear Low Density Polyethylene (LLDPE) and the temperature of the heated surface of said treatment chamber being in the range between approximately 225 degrees Fahrenheit and approximately 650 degrees Fahrenheit (approximately 105° C. and approximately 345° C.).

According to the invention, the step of feeding plastic material also includes feeding plastic material containing Polypropylene (PP) and the temperature of the heated surface of said treatment chamber being in the range between approximately 300 degrees Fahrenheit and approximately 650 degrees Fahrenheit (approximately 145° C. and approximately 345° C.).

And, according to the invention, the step of feeding plastic material includes feeding plastic material containing Polystyrene (PS) and the temperature of the heated surface of said treatment chamber being in the range between approximately 200 degrees Fahrenheit and 650 degrees Fahrenheit (approximately 90° C. and approximately 345° C.).

Further according to the invention, the step of feeding plastic material includes feeding plastic material containing polyvinylchloride (PVC) and the temperature of the heated surface of said treatment chamber being in the range between approximately 580 degrees Fahrenheit and 650 degrees Fahrenheit (approximately 45° C. and approximately 345° C.).

In a preferred aspect of the invention, the step of feeding plastic material includes feeding plastic material containing approximately 5–10, preferably 7 vol % of PVC, approximately 10–20, preferrably approximately 16 vol % of PP, approximately 15–25, preferrably approximately 21 vol % of HDPE, approximately 10–20, preferrably approximately 16 vol % of PS, and approximately 23–33, preferrably approximately 27 vol % of LDPE into said treatment chamber, and the temperature of the heated surface of said treatment chamber is approximately 720 degrees Fahrenheit (approximately 380° C.) to yield 20 cubic feet gaseous phase at approximately 86 degrees Fahrenheit (approximately 30° C.) having a minimum heat value of 1000 BTU per cubic foot (10.85 kWh/m$^3$) out of approximately one pound (0.45 kg) of the afore-defined mixture of feeded plastic material.

Similary, the step of feeding plastic material includes feeding plastic material containing approximately 5–10, preferably 7 vol % of PVC, approximately 10–20, preferrably approximately 16 vol % of PP, approximately 15–25, preferrably approximately 21 vol % of HDPE, approximately 10–20, preferrably approximately 16 vol % of PS, and approximately 23–33, preferrably approximately 27 vol % of LDPE into said treatment chamber, and the temperature of the heated surface of said treatment chamber is approximately 720 degrees Fahrenheit (approximately 380° C.) to yield approximately one gallon (3.8 l) of liquid distillate ranging in heat value from 19850 BTU per pound (12.82 kWh/kg) to 22300 BTU per pound (14.41 kWh/kg) having an API gravity of 48.4 and a specific gravity of 0.787 out of approximately 7 pounds (3.18 kg) of the afore-defined mixture of feeded plastic material.

In a preferred embodiment if the invention, the exhaust gas of a burner, a turbine or an internal combustion engine is utilized to heat said treatment chamber.

The invention is also related to the gaseous phase product and/or the liquid phase product obtained by the above described method.

Further, the invention is related to an apparatus to carry out the above described method according to the invention comprising a combustion engine having a fuel inlet and a exhaust outlet, a treatment chamber having an inlet for feeding plastics material into said treatment chamber and an outlet for the gaseous phase resulting from heat treating the plastics material in said treatment chamber, with the gaseous phase from the treatment chamber is fed into the fuel inlet of the combustion engine.

Preferably, a filter stage is provided between the outlet of said treatment chamber and the fuel inlet of the combustion engine to remove particles and other undesired components from the gaseous phase exiting the treatment chamber. And a condenser stage is provided between the outlet of said treatment chamber and the fuel inlet of the combustion engine to liquify condensable gas constituents. Moreover, a gas and/or liquid tank is provided between the outlet of said treatment chamber and the fuel inlet of the combustion engine. It is understood that the dependencies of the attached claims are not limiting the scope of the invention. Rather, other combinations of features are encompassed by the present invention as well. This becomes also obvious from the following detailed description.

BRIEF DESCRIPTION OF THE DRAWINGS

The FIGURE is a schematic of a thermal treating apparatus for treating plastic material.

DETAILED DESCRIPTION OF THE INVENTION

Further features, modifications, advantages and characteristics of the invention will become appearent to a person skilled in the art when studying the following description of the attached drawing showing a schematic diagram of a presently preferred embodiment of an apparatus for carrying out the invention.

A treatment chamber 10 made of stainless steel or the like has a substantially octagonal or hexagonal cross-section. The treatment chamber 10 is enclosed in a furnace chamber 12 provided with a heat insulating cover at its outside. The treatment chamber has an inlet 14 for feeding plastic material from a feed hopper 16 via a compressor/extruder 18.

Inside the treatment chamber 10, a rotary wiper 20 is provided in close proximity to or even in contact with the heated surface 22 of the treatment chamber 10 to remove char from that surface 22 through a outlet 24 of the treatment chamber 10. The wiper 20 is driven by a motor 26.

The outside of the heated surface 22 of the treatment chamber 10 is provided with fins 28 to force direct hot gas from a source described later along the outside of the heated surface 22. An outlet 30 for the gaseous phase resulting from heat treating the plastics material in said treatment chamber is also provided at that treatment chamber 10. The gaseous phase exiting the outlet 30 is fed into the fuel inlet 36 of a combustion engine 34.

The combustion engine 34 has an exhaust outlet 38 feeding into the furnace chamber 12 to heat the treatment chamber 10. The furnace chamber 12 is provided with an exhaust outlet 40 leading to a silencer (and a catalytic converter) 42 through which the exhaust gases from the combustion engine 34 take their way to the atmosphere. The combustion engine 34 has an output shaft 44 to run an automobile or a generator (not shown) or the like. Moreover, the motor 26 can be replaced by some gearing coupling the wiper 20 to the output shaft 44 of the combustion engine 34.

The gaseous phase exiting the outlet 30 of the treatment chamber 10 is fed into a condenser 46 to obtain to a liquid distillate of the condensable gas constituents when cooling the gaseous phase down to ambient temperature in this condenser 46. In a car or truck, the condenser 46 can be air-cooled.

Subseqently to the condenser 46, a filter 48 is provided to remove solid particles or other undesired residues from the liquid distillate. The gaseous phase of non-condensable gas constituents can be feed into a burner 50 through a duct 52 from the condenser 46 to the furnace chamber 12 to provide additional heating of the treatment chamber 10.

It is understood that the order of the condenser 46 and the filter 48 can also be reversed.

The filtered liquid distillate is fed into a tank 54 from where it is pumped by a fuel pump (not shown) into the fuel inlet of the combustion engine 34.

During operation of the apparatus, an oxygen level in said treatment chamber is maintained below combustion level of liquid or gaseous products from said plastic material. In practice, an oxygen level of substantially less than 1 vol % can be maintanied by feeding compressed and pelletized plastic material.

When maintaining a continuous operation of the apparatus, the plastic material is fed into to treatment chamber 10 at a rate ensuring a built-up of a thin film of liquified plastic material on the lower part of the interior of the surface 22 of the treatment chamber 10. The heating of the treatment chamber 10 and the feed rate of plastic material are coordinated such that the quantity of liquified plastic material undergoing a transition into the gaseous phase as a result of the heating of of the treatment chamber 10 is replaced by new plastic material while maintaining a liquid film more or less constant thickness of up to approximately 2 to 25 millimeters. The optimum thickness depends on the blend of the plastic material feeded into the treatment chamber 10 and can be found very easily through simple experiments. The gaseous phase resulting from the heat treatment of the plastic material is driven out of treatment chamber 10 due to vaporization pressure of the gaseous phase within treatment chamber 10. No additional or extra forces are applied. Moreover, the filter and condenser stage are configured and dimensioned to avoid any pressure build-up within the treatment chamber 10.

Feeding plastic material containing approximately 7 vol % of PVC, approximately 16 vol % of PP, approximately 21 vol % of HDPE, approximately 16 vol % of PS, and approximately 27 vol % of LDPE into the treatment chamber 10, while maintaining the temperature of the heated surface 22 of said treatment chamber 10 at approximately 720 degrees Fahrenheit (approximately 380° C.) provides a yield of twenty (20) cubic feet gaseous phase at approximately 86 degrees Fahrenheit (approximately 30° C.) having a minimum heat value of 1000 BTU per cubic foot (10.85 kWh/m$^3$) out of 1 pound (0.45 kg) of the afore-defined mixture of feeded plastic material.

Similary, feeding 7 pounds (3.18 kg) of the same blend of plastic material and maintaining the same of the heated surface 22 of said treatment chamber 10 yields one gallon (3.8 l) of liquid distillate ranging in heat value 19850 BTU per pound (12.82 kWh/kg) to 22300 BTU per pound (14.41 kWh/kg) having an API gravity of 48.4 and a specific gravity of 0.787.

Various modifications of the afore-described method and apparatus are possible. For example, the shape of the treatment chamber 10 can be varied to be more diamond-shaped or to be cylindrical with the wiper therein having an auger-type shape.

I claim:

1. A Method of thermally treating plastics material, including the following steps:

heating a treatment chamber to a temperature in the range between the melting point of at least a fraction of said plastic material and a point not significantly exceeding the point where the liquid phase of the molten material undergoes a transition into a gaseous phase;

maintaining an oxygen level in said treatment chamber below combustion level of liquid or gaseous products from said plastic material;

feeding said plastic material into said treatment chamber at a rate ensuring a build-up of a film of liquified plastic material on at least a part of the interior of the surface of said treatment chamber, with said liquified plastic material undergoing a transition into the gaseous phase as a result of the heating of said treatment chamber; and exiting of the gaseous phase out of said treatment chamber caused by vaporization pressure of the gaseous phase within said treatment chamber.

2. The method according to claim 1, including the step of compressing the plastic material prior to feeding it to into said treatment chamber.

3. The method according to claim 1, including the step of size-reduzing said plastic material prior to feeding it to into said treatment chamber to a size of 1 inch minus.

4. The method according to claim 1, including the step of condensing the condensable gas constituents of said gaseous phase exiting said treatment chamber to obtain a liquid distillate.

5. The method according to claim 4, including the step of filtering said liquid distillate.

6. The method according to claim 4, including the step of filtering said gaseous phase.

7. The method according to claim 6, including the step of compressing said gaseous phase into a gas storage container.

8. The method according to claim 6, including the step of mixing said gaseous phase with other combustible gases to increase the heat value of the resulting gas.

9. The method according to claim 1, including the step of using said non-condensable gas constituents of said gaseous phase and/or a portion of said liquid distillate to heat said treatment chamber.

10. The method according to claim 1, including the step of
removing residual char from said treatment chamber.

11. The method according to claim 1, wherein the step of heating said treatment chamber includes
heating the surface of said treatment chamber in the range between approximately 180 degrees Fahrenheit and approximately 720 degrees Fahrenheit.

12. The method according to claim 1, wherein the step of exiting said gaseous phase from said treatment chamber includes
maintaining a pressure differential of less than approximately 1 psig between the interior of said treatment chamber and a filtration stage or a condensing stage.

13. The method according to claim 1, wherein the step of feeding plastic material includes
feeding plastic material containing High Density Polyethylene (HDPE) and the temperature of the heated surface of said treatment chamber being in the range between approximately 245 degrees Fahrenheit and approximately 650 degrees Fahrenheit.

14. The method according to claim 1, wherein the step of feeding plastic material includes
feeding plastic material containing Low Density Polyethylene (LDPE) and the temperature of the heated surface of said treatment chamber being in the range between approximately 225 degrees Fahrenheit and approximately 650 degrees Fahrenheit.

15. The method according to claim 1, wherein the step of feeding plastic material includes
feeding plastic material containing Linear Low Density Polyethylene (LLDPE) and the temperature of the heated surface of said treatment chamber being in the range between approximately 225 degrees Fahrenheit and approximately 650 degrees Fahrenheit.

16. The method according to claim 1, wherein the step of feeding plastic material includes
feeding plastic material containing Polypropylene (PP) and the temperature of the heated surface of said treatment chamber being in the range between approximately 300 degrees Fahrenheit and approximately 650 degrees Fahrenheit.

17. The method according to claim 1, wherein the step of feeding plastic material includes
feeding plastic material containing Polystyrene (PS) and the temperature of the heated surface of said treatment chamber being in the range between approximately 200 degrees Fahrenheit and 650 degrees Fahrenheit.

18. The method according to claim 1, wherein the step of feeding plastic material includes
feeding plastic material containing Polyvinylchloride (PVC) and the temperature of the heated surface of said treatment chamber being in the range between approximately 580 degrees Fahrenheit and 650 degrees Fahrenheit.

19. The method according to claim 1, wherein wherein the step of feeding plastic material includes
feeding plastic material containing approximately 7 vol % of PVC, approximately 16 vol % of PP, approximately 21 vol % of HDPE, approximately 16 vol % of PS, and approximately 27 vol % of LDPE, and the temperature of the heated surface of said treatment chamber is approximately 720 degrees Fahrenheit to yield approximately 20 cubic feet gaseous phase at approximately 86 degrees Fahrenheit having a minimum heat value of 1000 BTU per cubic foot out of approximately one pound of the afore-defined feeded plastic material.

20. The method according to claim 1, wherein the step of feeding plastic material includes
feeding plastic material containing approximately 7 vol % of PVC, approximately 16 vol % of PP, approximately 21 vol % of HDPE, approximately 16 vol % of PS, and approximately 27 vol % of LDPE, and the temperature of the heated surface of said treatment chamber is approximately 720 degrees Fahrenheit to yield approximately one gallon of liquid distillate ranging in heat value from 19850 BTU per pound to 22300 BTU per pound having an API gravity of 48.4 and a specific gravity of 0.787 out of approximately 7 pounds of the afore-defined feeded plastic material.

21. The method according to claim 1, wherein the step of heating said treatment chamber includes the step of
utilizing the exhaust gas of a burner, a turbine or an internal combustion engine to heat said treatment chamber.

22. Gaseous phase product obtained by the method according to claim 1.

23. Liquid phase product obtained by the method according to claim 1.

24. Apparatus to carry out the method according to claim 1, comprising:
a combustion engine (34) having a fuel inlet (36) and an exhaust outlet (38),
a treatment chamber (10) having an inlet (14) for feeding plastics material into said treatment chamber (10), and an outlet (30) for the gaseous phase resulting from heat treating the plastics material in said treatment chamber (10), wherein
the gaseous phase resulting from heat treating the plastics material in said treatment chamber (10) and exiting through said exhaust outlet (38) of said treatment chamber (10) is fed into said fuel inlet (36) of said combustion engine (34).

25. Apparatus according to claim 24, wherein
a filter stage (48) is provided between the outlet (30) of said treatment chamber (10) and the fuel inlet (36) of the combustion engine (34).

26. Apparatus according to claim 24, wherein
a condenser stage (46) is provided between the outlet (30) of said treatment chamber (10) and the fuel inlet (36) of the combustion engine (34).

27. Apparatus according to claim 24, wherein a gas and/or liquid tank (54) is provided between the outlet (30) of said treatment chamber (10) and the fuel inlet (36) of the combustion engine (34).

28. Apparatus to carry out the method according to claim 1, comprising:

a combustion engine (34) having a fuel inlet (36) and an exhaust outlet (38), a treatment chamber (10) having an inlet (14) for feeding plastics material into said treatment chamber (10), and an outlet (30) for the gaseous phase resulting from heat treating the plastics material in said treatment chamber (10), wherein said gaseous phase exiting said outlet (30) of said treatment chamber (10) is fed into a condenser (46) to obtain to a liquid distillate of the condensable gas constituents, said liquid distillate obtained in said condenser (46) is fed into a filter (48) to remove solid particles or other undesired residues from the liquid distillate, said gaseous phase of non-condensable gas constituents exiting said condenser (46) is fed into a burner (50) to provide additional heating of said treatment chamber (10), said filtered liquid distillate is fed into a tank (54) from where it is pumped into the fuel inlet (36) of said combustion engine (34).

* * * * *